(12) United States Patent
Chiu

(10) Patent No.: US 8,944,258 B2
(45) Date of Patent: Feb. 3, 2015

(54) BICYCLE PARKING APPARATUS

(71) Applicant: Fu-Sheng Chiu, Taichung (TW)

(72) Inventor: Fu-Sheng Chiu, Taichung (TW)

( * ) Notice: Subject to any disclaimer, the term of this patent is extended or adjusted under 35 U.S.C. 154(b) by 0 days.

(21) Appl. No.: 13/694,718

(22) Filed: Dec. 27, 2012

(65) Prior Publication Data

US 2014/0183147 A1    Jul. 3, 2014

(51) Int. Cl.
*A47F 7/00* (2006.01)
*B62H 3/00* (2006.01)
*A47B 45/00* (2006.01)
*A47F 5/10* (2006.01)
*A47F 7/04* (2006.01)
*B62H 3/06* (2006.01)
*B60R 9/10* (2006.01)
*B62H 3/04* (2006.01)

(52) U.S. Cl.
CPC *B62H 3/00* (2013.01); *A47B 45/00* (2013.01); *A47F 5/10* (2013.01); *A47F 7/04* (2013.01); *B62H 3/06* (2013.01); *B60R 9/10* (2013.01); *B62H 3/04* (2013.01)
USPC .............................. 211/17; 211/182; 211/195

(58) Field of Classification Search
CPC ...... B62H 3/00; B62H 2003/005; B62H 3/02; B62H 3/04; B62H 3/06; B62H 3/08; B62H 3/10; B62H 3/12; B60R 9/10; B60R 9/08; A47F 7/04; A47F 5/13; A47F 5/10; B25H 1/0014; B25H 1/0021; A47B 45/00; F16B 12/40; F16B 2012/403
USPC ........... 211/17, 182, 20, 21, 22, 175, 24, 189, 211/204, 206, 13.1; 248/295.11, 298.11; 280/79.1, 293, 304, 299
See application file for complete search history.

(56) References Cited

U.S. PATENT DOCUMENTS

| | | | | |
|---|---|---|---|---|
| 528,028 A | * | 10/1894 | Pierce | 211/17 |
| 547,412 A | * | 10/1895 | Boerum | 211/17 |
| 556,758 A | * | 3/1896 | Lefebre, Jr. | 211/22 |
| 574,628 A | * | 1/1897 | Phillips | 211/22 |
| 602,665 A | * | 4/1898 | McBurney et al. | 211/22 |
| 603,422 A | * | 5/1898 | Burkhardt | 211/22 |
| 640,631 A | * | 1/1900 | Conti | 211/22 |
| 1,202,444 A | * | 10/1916 | Soleau | 211/4 |
| 1,241,486 A | * | 10/1917 | Armstrong | 211/17 |
| 2,707,841 A | * | 5/1955 | Figura | 38/111 |
| D201,143 S | * | 5/1965 | Vigilante | D12/217 |
| 3,202,289 A | * | 8/1965 | Burditt | 211/22 |
| 3,348,697 A | * | 10/1967 | Saunders | 211/22 |
| 3,722,702 A | * | 3/1973 | Marker, Jr. | 211/204 |
| 4,609,183 A | * | 9/1986 | Ulmer | 256/1 |

(Continued)

*Primary Examiner* — Jennifer E Novosad
(74) *Attorney, Agent, or Firm* — Raymond Y. Chan; David and Raymond Patent Firm

(57) ABSTRACT

An improved bicycle parking structure is disclosed, including a parking base having a third tubular shaft and a pair of second tubular shafts, a pair of tubular shaft jackets; featuring a first tubular shaft having a tubular space adapted for extensible and collapsible movement of a second tubular shaft, a tubular shaft jacket disposed underneath a tubular shaft opening of the first tubular shaft, wherein outer diameter of an end of the jacket is slightly larger than outer diameter of first tubular shaft, outer diameter of a connector of another end occurs to match inner diameter of tubular shaft opening. Said connector is coupled to the inner wall of the tubular shaft opening, so the second tubular shaft can be locked into an expanded portion of an end of the second tubular shaft when inserted into tubular shaft opening, to therefore effectively reduce second tubular shaft length for space conservation.

9 Claims, 5 Drawing Sheets

(56) References Cited

U.S. PATENT DOCUMENTS

| | | | |
|---|---|---|---|
| 4,768,782 A * | 9/1988 | Blackburn | 482/59 |
| 4,941,651 A * | 7/1990 | Phillips | 482/61 |
| 4,979,759 A * | 12/1990 | Solovay | 280/293 |
| 5,050,785 A * | 9/1991 | Hays | 224/511 |
| 5,082,120 A * | 1/1992 | Vega | 211/20 |
| 5,088,420 A * | 2/1992 | Russell | 108/106 |
| 5,090,725 A * | 2/1992 | Feldner | 280/651 |
| 5,108,141 A * | 4/1992 | Anderson | 296/3 |
| 5,417,629 A * | 5/1995 | Phipps | 482/61 |
| 5,660,637 A * | 8/1997 | Dodge | 118/500 |
| 5,862,921 A * | 1/1999 | Venegas, Jr. | 211/17 |
| 6,053,337 A * | 4/2000 | Venegas, Jr. | 211/22 |
| 6,216,882 B1 * | 4/2001 | Strunck et al. | 211/18 |
| 6,375,202 B2 * | 4/2002 | Weck et al. | 280/47.35 |
| 6,488,157 B2 * | 12/2002 | Chen | 211/20 |
| 6,640,979 B1 * | 11/2003 | Mayfield | 211/20 |
| 6,843,380 B1 * | 1/2005 | Fickett | 211/22 |
| 6,902,074 B2 * | 6/2005 | Albrecht | 211/189 |
| 6,983,853 B1 * | 1/2006 | Fickett | 211/18 |
| 7,108,140 B2 * | 9/2006 | Whitnall et al. | 211/22 |
| D539,806 S * | 4/2007 | Yu et al. | D14/447 |
| 7,658,388 B1 * | 2/2010 | Rodriguez et al. | 280/30 |
| 7,988,000 B2 * | 8/2011 | Clark et al. | 211/189 |
| 8,141,888 B1 * | 3/2012 | Levasa et al. | 280/79.7 |
| 8,342,544 B1 * | 1/2013 | Blewett et al. | 280/79.11 |
| 8,360,252 B1 * | 1/2013 | Fagan | 211/21 |
| 8,528,748 B2 * | 9/2013 | Shaha et al. | 211/22 |
| 2002/0117459 A1 * | 8/2002 | Chen | 211/20 |
| 2003/0010729 A1 * | 1/2003 | Lopez De Luzuriaga | 211/22 |
| 2006/0266717 A1 * | 11/2006 | Tsai | 211/17 |
| 2007/0034657 A1 * | 2/2007 | Murray | 224/497 |
| 2008/0000848 A1 * | 1/2008 | Chiu | 211/21 |
| 2008/0110841 A1 * | 5/2008 | Huang | 211/17 |
| 2010/0237027 A1 * | 9/2010 | Shaha et al. | 211/17 |

* cited by examiner

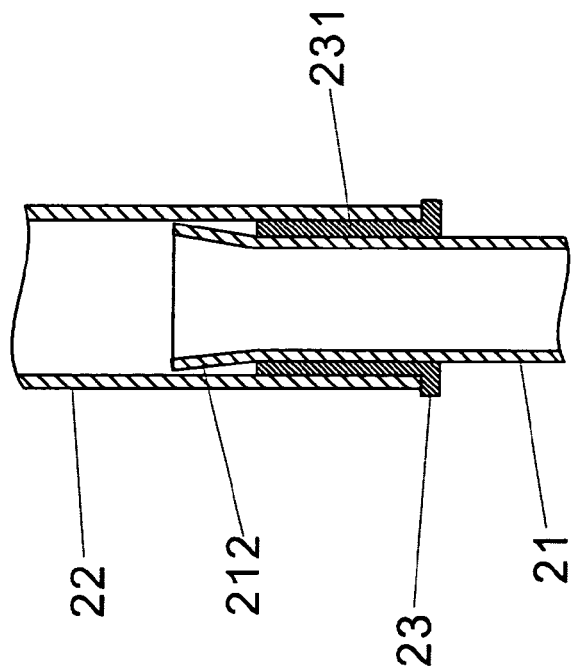
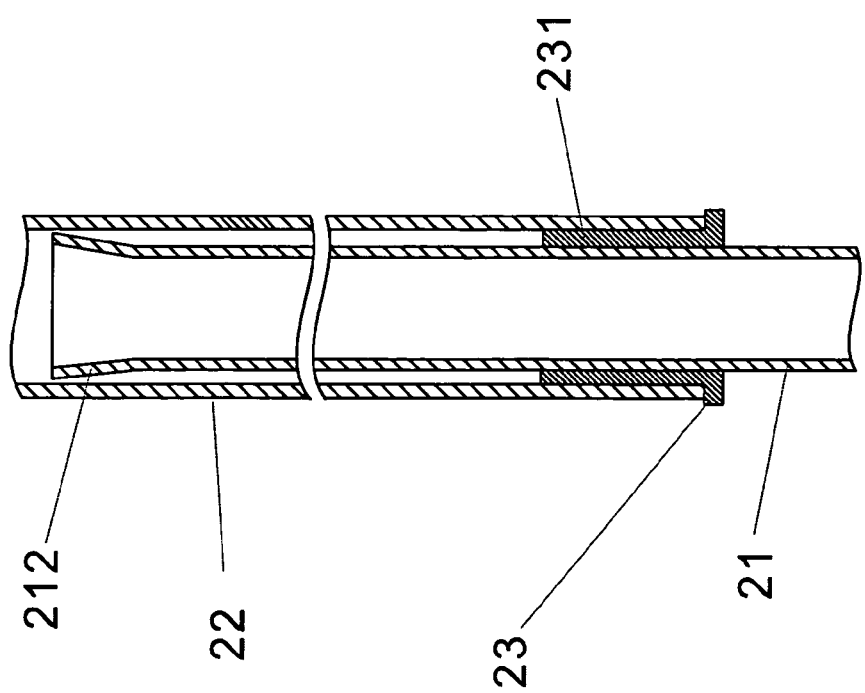
Fig. 3-1
Fig. 3-2

BICYCLE PARKING APPARATUS

BACKGROUND OF THE INVENTION

1. Fields of the Invention

The present invention relates to an improved bicycle parking apparatus, more particularly to an improvement for a bicycle parking apparatus adapted for adjusting the size of the apparatus to minimize its storage volume.

2. Descriptions of Related Art

It is known, for example as described in Taiwanese Patent TW1002244119 to provide a collapsible automobile frame structure, wherein an automobile frame structure is disclosed, comprising: a lower frame having a lower tank; a first tubular shaft that is adjustably attached onto a lower frame, the first tubular shaft has two sets of multiple-gear second tubular shafts located on an upper end of the first tubular shaft at an end of the first tubular shaft as connected by a connecting tubular shaft, so as to form a lateral frame tank between the two sets of multiple-gear second tubular shafts.

A known disadvantage with this prior invention is the complicated and redundant work processing involved. In order to save on labor cost and facilitate in assembly processing, an object of the present invention is mainly focused on improving over this issue. A utility patent application is further requested herewith at the completion of the present invention.

SUMMARY OF THE INVENTION

A primary object of the present invention is to provide an improved bicycle parking apparatus having a second tubular shaft, which, by the adjustment of the tubular shaft, can work to effectively reduce its volume, to minimize its storage volume.

In order to achieve the above object, the present invention discloses an improvement for a bicycle parking apparatus, the apparatus comprises: a parking base having a first tubular shaft, a pair of second tubular shaft, a pair of third tubular shaft and a pair of tubular shaft jacket; wherein, the parking base is made of an assembly of the first tubular shaft and the second tubular shaft that are arrayed in a parallel fashion. A pair of parallel third tubular shafts is securely disposed between the first tubular shaft and the second tubular shaft in an interweaving fashion, a side of the third tubular shaft curves and extends in an upward direction and the diameter at the distal end tapers to form a second connector, the outer diameter of the second connector is smaller than the outer diameter of the enfolding portion so as to permit a fitting installment;

A first locking member is disposed on the third tubular shaft at a position in contact with the second connector, the first locking member is composed of a pin and a flexible plate; an end of the pin operably extends through the outer perimeter of the second connector, and the other end of the pin is connected to an end of the parabolic-shaped flexible plate, the flexible plate can operably work to support an end of the pin to be held protruding outwardly from the outer perimeter of the second connector;

The third tubular shaft has a tubular space for allowing extension and contraction of the second tubular shaft when the second tubular shaft is inserted therein. A tubular shaft jacket can be attached to a tubular shaft opening underneath the first tubular shaft, an outer diameter of an end of the tubular shaft jacket is slightly larger than the outer diameter of the first tubular shaft, the outer diameter of the connector at the other end occurs to appropriately fit the inner diameter of the tubular shaft. The connector is attached onto the inner wall of the tubular shaft in such a way that the expanded portion of the second tubular shaft is securely positioned at the connector after the second tubular shaft is inserted into the tubular shaft opening. After the second tubular shaft expands to its longest form, due to the configuration of the diameter of the expanded portion located at an end of the second tubular shaft being larger than the diameter of the enfolding portion, the second tubular shaft can occur to be fastened in a fixed position and not disconnect from the first tubular shaft;

The second tubular shaft is a metallic tubular shaft, wherein a bottom end of the shaft is disposed with an enfolding portion, which is configured to work to connect the second connector of the third tubular shaft, wherein the other end of the relative base end has an expanded portion so as to allow the first tubular shaft to be fastened to a given position. Additionally a pin locking member is located at a side of the enfolding portion at the based end of the second tubular shaft, the purpose of which is to immobilize the pin of the third tubular shaft;

The tubular shaft jacket is a plastic work piece, the outer diameter of an end of it is larger than the outer diameter of the first tubular shaft, and the other end is disposed with a connector, whose outer diameter occurs to fit the inner diameter of the tubular shaft opening.

In another aspect of the present invention, the third tubular shaft has a second connector and a pin, which are involved in the assembly with the enfolding portion of the second tubular shaft; for the parking base, two parallel frames are welded or threaded to the third tubular shaft, when the parking base and the third tubular shaft are combined into a single device, the second tubular shaft works to insert into the second connector of the third tubular shaft. Due to the effect of an elastic device, the pin installed on the second connector can be attached in the pin locking member of the second tubular shaft, the second tubular shaft is retractable within the tubular shaft of the first tubular shaft, so that the length of the second tubular shaft can be effectively shortened to a manageable size for storage.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 3-1 is a cross-sectional view showing a portion of the apparatus of the present invention.

FIG. 3-2 is another cross-sectional view showing a portion of the apparatus of the present invention.

DETAILED DESCRIPTION OF THE PREFERRED EMBODIMENT

Figure 1:
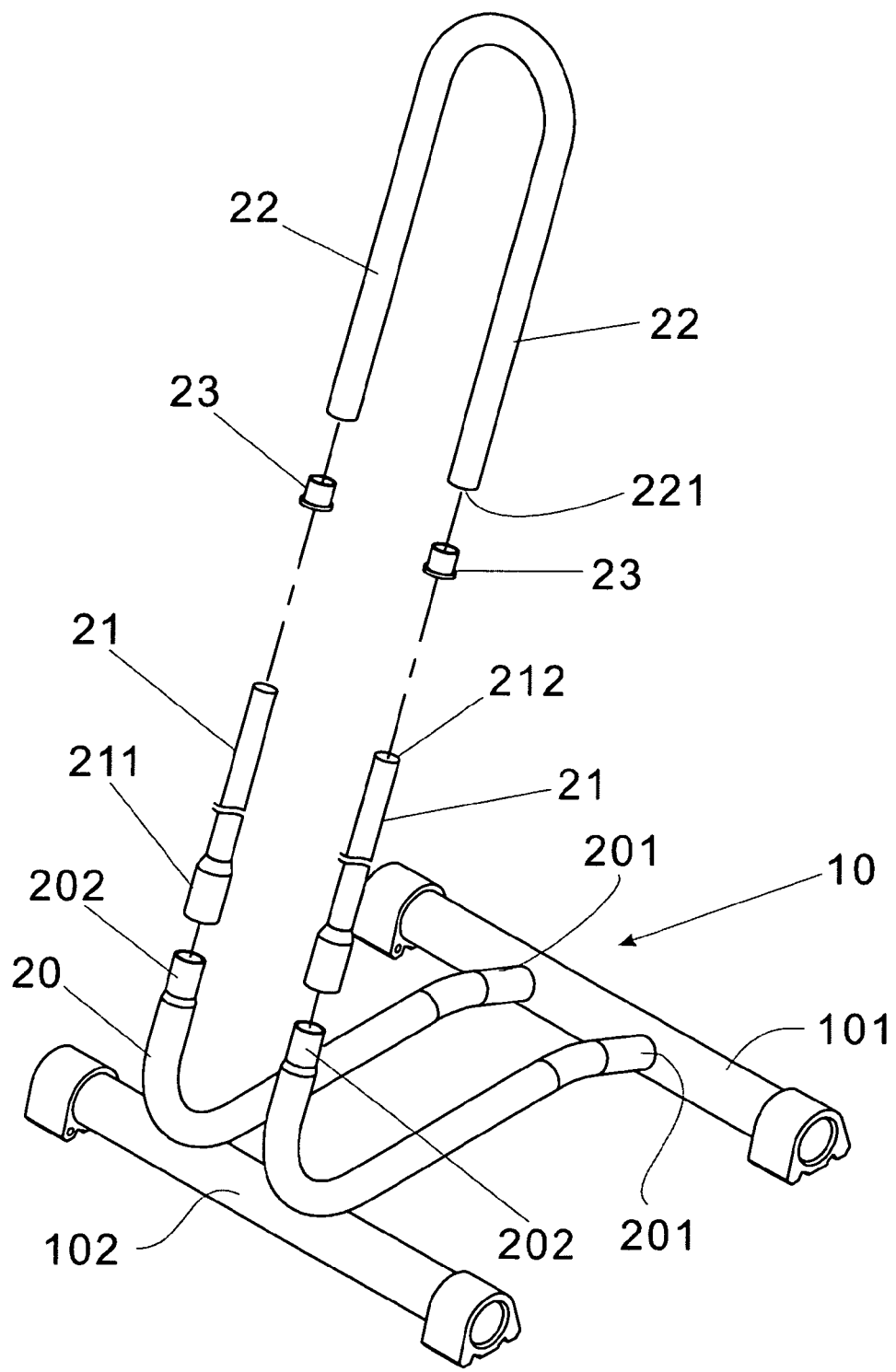
FIG. 1 is an exploded perspective view of an apparatus of the present invention.
Figure 2:
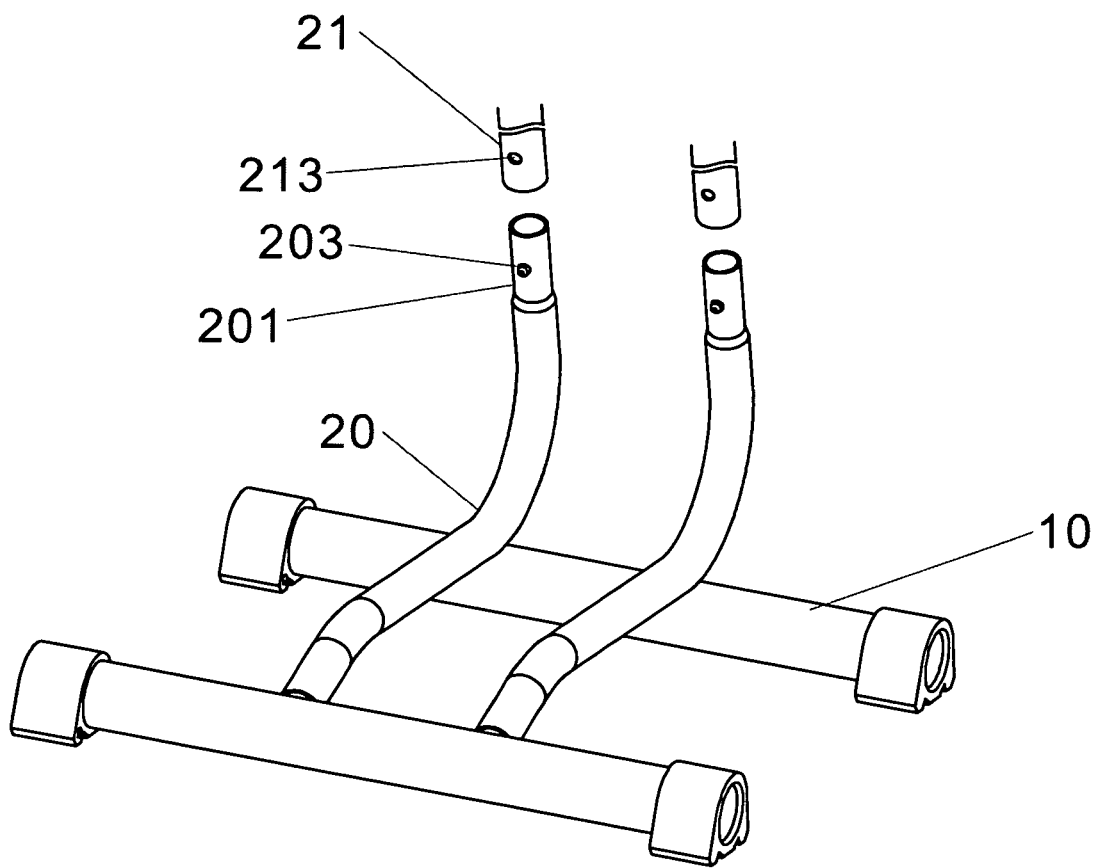
FIG. 2 is a schematic diagram showing a portion of the apparatus of the present invention.

The following description, along with the drawings attached herewith showing a preferred embodiment of the present invention, is provided here for reference for the skilled persons related to the technical field of the present invention. Examples disclosed in the current written description are the following:

Referring now to FIG. 1, an improved bicycle parking apparatus of the present invention is disclosed, comprising: a parking base 10, a pair of third tubular shaft 20, a pair of second tubular shaft 21, and a pair of tubular shaft jacket 23; wherein, the parking base 10 is made of a first frame 101 and a second frame 102 assembled in a parallel arrangement, a pair of parallel third tubular shafts 20 is disposed in a perpendicular fashion between the first frame 101 and the second frame 102 by means of lock or welding, the third tubular shaft 20 has a first connector 201 and a second connector 202, the first connector 201 is welded onto the first frame 101, a side of the third tubular shaft 20 curves and extends upward, and is welded onto the second frame 102 at a position where the third tubular shaft curves. The third tubular shaft tapers off in size when inside the second connector 202, the outer diameter of the tubular shaft of the second connector 202 is smaller than the outer diameter of the enfolding portion 211 of the second tubular shaft 21, so as to allow connection;

For the abovementioned connection manner, as shown in FIG. 2, a first pin locking member is disposed on the third tubular shaft 20 at the second connector 202, the first pin locking member comprises a pin 203 and a flexible plate; an end of the described pin 203 sticks out through the outer perimeter of the second connector 202, the other end of which is connected to an end of the parabolic shaped flexible plate, an end of the pin 203 can be held out to stick outside the outer perimeter by the support of the flexible plate;

The second tubular shaft 21 is a metallic tubular shaft, wherein the parking base has an enfolding portion 211, which can work to connect with the second connector 202 of the third tubular shaft 20, the relatively other end of the parking base is disposed with an expanded portion 212, so as to allow the first tubular shaft 22 to be fixed to a specific position. Additionally, a pin locking member 213 is disposed at a side of the enfolding portion 211 of the bottom end of the second tubular shaft 21, which can work to restrict the pin 203 of the third tubular shaft 20 to a specific position;

The tubular shaft jacket 23 is a plastic work piece, an outer diameter of an end is larger than an outer diameter of the first tubular shaft 22, the other end has a coupling portion 231, the outer diameter of which occurs to fit the inner diameter of the tubular shaft opening 221.

Figure 4:
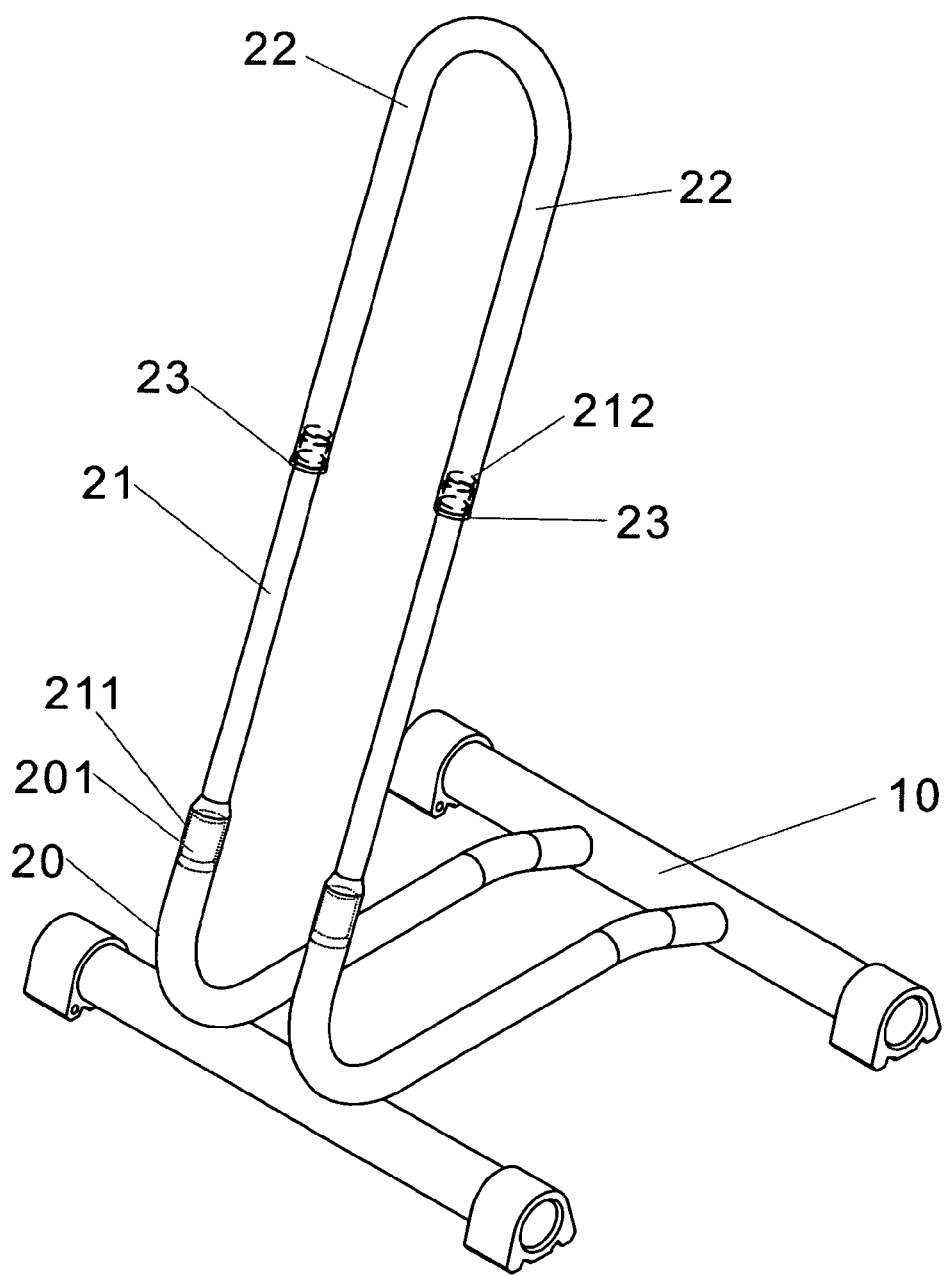
FIG. 4 is an example showing preferred embodiment of the present invention in its full extended form.
Figure 5:
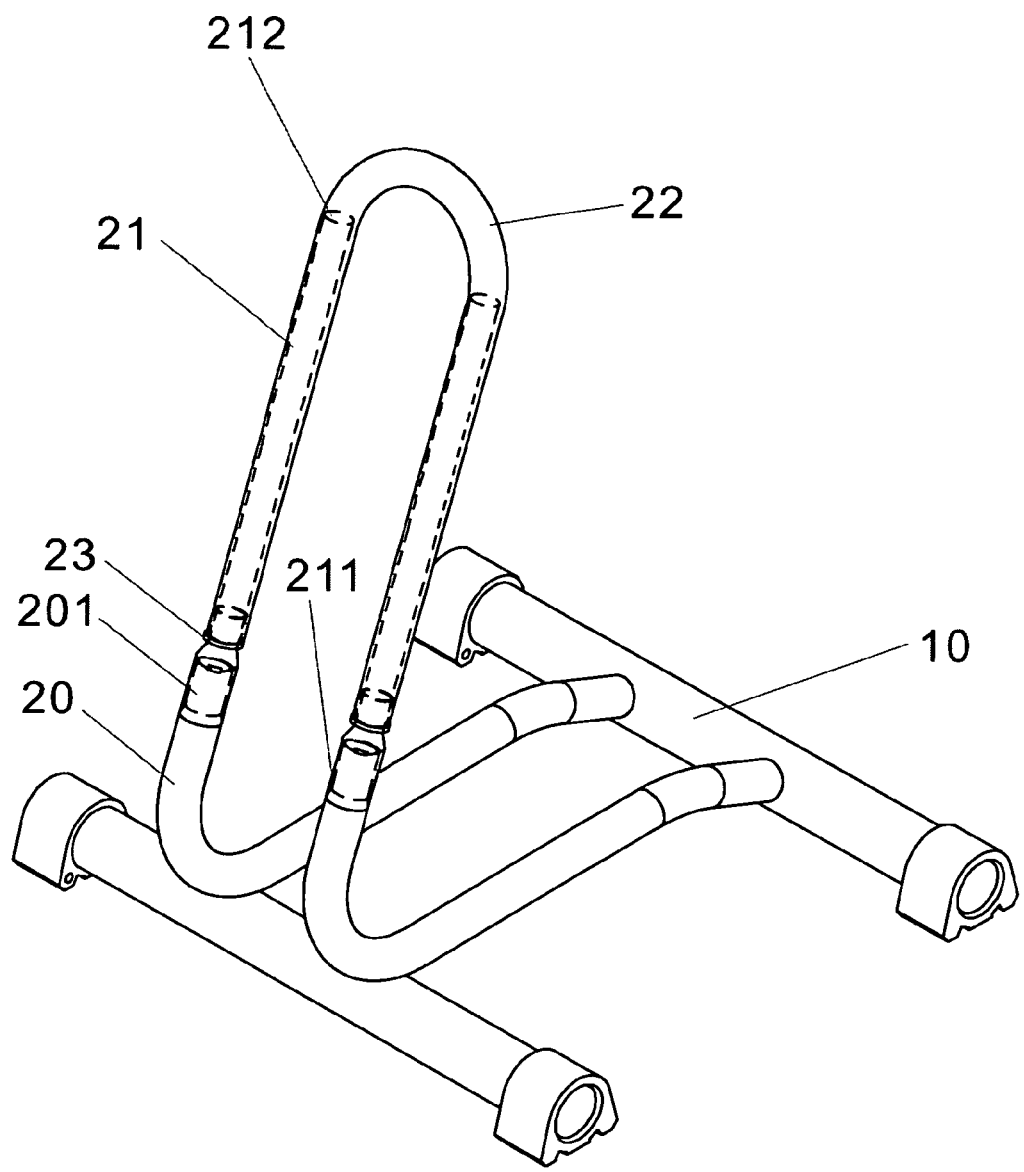
FIG. 5 is an example showing preferred embodiment of the present invention in its collapsible form.

A preferred embodiment of the present invention, as disclosed in FIGS. 2, 3, 4, is characterized in that: the first tubular shaft 22 has a tubular shaft space that allows extension and contraction of the second tubular shaft 21, the tubular shaft opening 221 beneath the first tubular shaft 22 can be attached by gluing with a tubular shaft jacket 23;

In connection with the above, the manners by which the second tubular shaft 21 and the first tubular shaft 22 are produced and assembled are: after the first tubular shaft jacket 23 is installed in the second tubular shaft 21, a mechanical means operates to expand its distal end into an expanded portion 212, so as to insert the second tubular shaft 21 into the first tubular shaft 22, and further make the connector 231 of the tubular shaft jacket 23 attached to the tubular shaft opening of the first tubular shaft 22, for the purpose of inserting the second tubular shaft 21 into the tubular shaft 221 of the first tubular shaft 22, when the second tubular shaft 21 is expanded, the expanded portion 212 would be securely fixed into a specific position at the connector 231; after the second tubular shaft 21 is expanded to its highest length, because the expanded portion 212 at the distal end of the second tubular shaft is larger than the connector 231 of the tubular shat jacket 23, the second tubular shaft 21 occurs to be securely fixed into a specific position and not disconnect from the tubular shaft of the first tubular shaft 22.

Furthermore, when the second tubular shaft 21 is in its collapsible form within the first tubular shaft 22, only a minimal force is required to press downward on the first tubular shaft 22, to disengage the expanded portion 212 of the second tubular shaft 21 from the connector 231 of the tubular shaft jacket 23 and move toward the first tubular shaft 22, as shown in FIG. 3-1, wherein the tubular shaft jacket 23 is made of plastic. Due to the combined effect of flexible property of the plastic and the rigid property of the metal material of the second tubular shaft 21, the second tubular shaft 21 can be temporarily fixed into the distal end of the connector 231 of the tubular shaft jacket 23, as shown in FIG. 3-2; under the applied pressure of the first tubular shaft 22, the second tubular shaft 21 will be disengaged from the connector 231 of the tubular shaft jacket 23 and collapse toward the first tubular shaft 22, by which to minimize the volume of the entire parking structure.

When the second tubular shaft 21 of the present invention is assembled with the first tubular shaft 22, the second tubular shaft 21 is inserted from bottom to top, into the inner tubular space of the first tubular shaft 22 through its tubular shaft opening 221 Afterwards, the connector 231 of the tubular shaft jacket 23 is inserted into the tubular shaft opening 221 before subject to attachment by gluing or threading. The expanded portion at the upper end of the second tubular shaft 21 can be pulled to reach the connector 231 before immediately becoming securely fixed in a specific position, the secure fixing operates by using the weight of the first tubular shaft 22, when the first tubular shaft 22 is pulled upward, the first tubular shaft 22 will be subject to inclination due to its weight, through this mechanism, the expanded portion 212 can be securely fixed inside the tubular shaft of the first tubular shaft 22, with the plastic property of the tubular shaft jacket 23, the fixing of the expanded portion 212 on the edge of the distal end of the connector 231 can be further strengthened.

The second tubular shaft 21 is made from metallic material, the tubular shaft jacket 23 is made from plastic material, and the second tubular shaft 21 can also be a tubular shaft connected by a multi-gear mechanism.

In view of the foregoing, a preferred embodiment of the present invention is presented, and is not meant to be restrict the protective scope for embodiments under the present invention. It will be understood that various changes in the details, materials, and arrangements of the parts which have been described and illustrated herein may be made by those skilled in the art without departing from the principles and scope of the invention as expressed in the following claims.

What is claimed is:

1. A bicycle parking structure, comprising:
   a parking base;
   two second tubular shafts, wherein each of said second tubular shafts has an expanded portion upwardly extended from said parking base;
   a U-shaped first tubular shaft having two ends and defining two tubular shaft openings, wherein said expanded portions of said second tubular shafts are slidably inserted into said first tubular shaft at said tubular shaft openings respectively to selectively adjust a distance between said first tubular shaft and said parking base, such that said first tubular shaft is upwardly slid to extend said distance between said first tubular shaft and said parking base, and is downwardly slid to reduce said distance between said first tubular shaft and said parking base; and
   two tubular shaft jackets which are made of plastic, wherein each of said tubular shaft jackets has one end having an outer diameter larger than an outer diameter of said first tubular shaft and an opposed end defining a coupling portion which has an outer diameter matching with an inner diameter of said tubular shaft opening of said first tubular shaft, wherein said coupling portion of each of said tubular shaft jackets is coupled at a space between said second tubular shaft and said first tubular shaft when said expanded portion of second tubular shaft is slidably inserted into said first tubular shaft so as to retain said distance between said first tubular shaft and said parking base.

2. The bicycle parking structure, as recited in claim 1, wherein an outer diameter of said expanded portion of each of said second tubular shafts is larger than the outer diameter of said coupling portion of each of said tubular shaft jackets, such that when said first tubular shaft is upwardly pulled to extend said distance between said first tubular shaft and said parking base, said expanded portions of said second tubular shafts are blocked by said tubular shaft jackets to prevent said first tubular shaft detaching from said second tubular shafts.

3. The bicycle parking structure, as recited in claim 2, further comprising two third tubular shafts, wherein each of said third tubular shafts comprises a first connector securely affixed on said parking base and a second connector, wherein each of said second tubular shafts further has an enfolding portion downwardly extended from said expanded portion and detachably coupled with said third tubular shaft via said first connector so as to detachably couple said second tubular shafts with said third tubular shafts respectively, wherein when said first tubular shaft is downwardly slid to reduce said distance between said first tubular shaft and said parking base, said two ends of said first tubular shaft are blocked by said enfolding portions of said third tubular shafts respectively.

4. The bicycle parking structure, as recited in claim 3, wherein each of said third tubular shafts has a curve portion upwardly extended from said parking base and a tapered end slidably inserted into said enfolding portion of said second tubular shaft.

5. The bicycle parking structure, as recited in claim 4, wherein said parking base comprises first and second frames extended in a parallel arrangement, wherein said third tubular shafts are perpendicularly coupled on said first and second frames, wherein said first connector of each of said third tubular shafts is affixed at said first frame.

6. The bicycle parking structure, as recited in claim 5, wherein said first tubular shaft is inclinedly extended from said parking base.

7. A bicycle parking structure, comprising:

a parking base;

two second tubular shafts, wherein each of said second tubular shafts has an expanded portion upwardly extended from said parking base;

a U-shaped first tubular shaft having two ends and defining two tubular shaft openings, wherein said expanded portions of said second tubular shafts are slidably inserted into said first tubular shaft at said tubular shaft openings respectively to selectively adjust a distance between said first tubular shaft and said parking base, such that said first tubular shaft is upwardly slid to extend said distance between said first tubular shaft and said parking base, and is downwardly slid to reduce said distance between said first tubular shaft and said parking base; and two third tubular shafts, wherein each of said third tubular shafts comprises a first connector securely affixed on said parking base and a second connector, wherein each of said second tubular shafts further has an enfolding portion downwardly extended from said expanded portion and detachably coupled with said first connector of said third tubular shaft so as to detachably couple said second tubular shafts with said third tubular shafts respectively, wherein when said first tubular shaft is downwardly slid to reduce said distance between said first tubular shaft and said parking base, said two ends of said first tubular shaft are blocked by said enfolding portions of said third tubular shafts respectively.

8. The bicycle parking structure, as recited in claim 7, wherein each of said third tubular shafts has a curve portion upwardly extended from said parking base and a tapered end slidably inserted into said enfolding portion of said second tubular shaft.

9. The bicycle parking structure, as recited in claim 8, wherein said parking base comprises first and second frames extended in a parallel arrangement, wherein said third tubular shafts are perpendicularly coupled on said first and second frames, wherein said first connector of each of said third tubular shafts is affixed at said first frame.

\* \* \* \* \*